US006391351B2

(12) United States Patent
Valcarce

(10) Patent No.: US 6,391,351 B2
(45) Date of Patent: May 21, 2002

(54) METHODS FOR TREATING FOODSTUFFS USING CELL FREE EXTRACTS FROM CILIATES

(76) Inventor: German A. Valcarce, Bustamante 2434 5 b, Buenos Aires (AR)

(*) Notice: Subject to any disclaimer, the term of this patent is extended or adjusted under 35 U.S.C. 154(b) by 0 days.

(21) Appl. No.: 09/835,804

(22) Filed: Apr. 16, 2001

Related U.S. Application Data

(63) Continuation-in-part of application No. 09/641,609, filed on Aug. 17, 2000.
(60) Provisional application No. 60/177,252, filed on Jan. 20, 2000, provisional application No. 60/172,844, filed on Dec. 20, 1999, provisional application No. 60/153,754, filed on Sep. 13, 1999, and provisional application No. 60/153,741, filed on Sep. 13, 1999.

(51) Int. Cl.[7] ........................ A23C 9/12; A23C 3/3571; A23B 5/16
(52) U.S. Cl. ................ 426/42; 426/47; 426/56
(58) Field of Search ................ 426/32, 33, 34, 426/38, 40, 42, 47, 56, 580, 614; 435/258.1, 947

(56) References Cited

U.S. PATENT DOCUMENTS

| | | |
|---|---|---|
| 4,104,286 A | 8/1978 | Fallis et al. |
| 4,234,619 A | 11/1980 | Yano et al. |
| 4,333,959 A | 6/1982 | Bracco et al. |
| 4,880,573 A | 11/1989 | Courregelongue et al. |
| 4,921,710 A | 5/1990 | Beitz et al. |
| 4,997,668 A | 3/1991 | Johnson et al. |
| 5,039,541 A | 8/1991 | Keen |
| 5,091,203 A | 2/1992 | Conte, Jr. et al. |
| 5,092,964 A | 3/1992 | Conte, Jr. et al. |
| 5,116,628 A | 5/1992 | Ogasahara et al. |
| 5,326,579 A | 7/1994 | Richardson et al. |
| 5,378,487 A | 1/1995 | Merchant et al. |
| 5,780,095 A | 7/1998 | Jackeschky |
| 5,856,156 A | 1/1999 | Ambrosius et al. |
| 5,876,993 A | 3/1999 | Saito et al. |

FOREIGN PATENT DOCUMENTS

| | | |
|---|---|---|
| DE | 42 38 842 A1 | 5/1994 |
| WO | 99/17620 | 4/1999 |

OTHER PUBLICATIONS

Mallory et al., "Dehydrogenation and Dealkylation of Various Sterols by *Tetrahymena pyriformis*", Lipids, vol. 6, No. 3, pp. 149–153 Mar. 1970.

Conner et al., "The Steric Requirements for Sterol Inhibition of Tetrahymanol Biosynthesis", Lipids, vol. 13, No. 10, pp. 692–696 Oct. 1978.

Ferguson et al., "Effect of Sterol Replacement in Vivo on the Fatty Acid Composition of *Tetrahymena*", Journal of Biological Chemistry, vol. 250, No. 17, pp. 6998–7005 Jan. 1975.

Hellenbroich et al., "Cultivation of *Tetrahymena thermophila* in a 1.5–m³ airlift bioreactor", Appl. Microbiol. Biotechnol, vol. 51, pp. 447–455 Jan. 1999.

Conner et al., "The Conversion of Cholesterol to $\Delta^{5,7,22}$–Cholestatrien–3β–ol by *Tetrahymena pyriformis*", Journal of Biological Chemistry, vol. 244, No. 9, pp. 2325–2333 Sep. 1999.

Bertram et al., "Isolation of a Stearoyl CoA Desaturase from *Tetrahymena thermophila*", J. Protozool vol. 28, No. 1, pp. 127–131 Jan. 1981.

Valcarce et al., "Isolation of a $\Delta^7$–cholesterol desaturase from *Tetrahymena thermophila*", Appl. Microbiol. Biotechnol. vol. 53, pp. 591–595 Jan. 2000.

L. Rusoff, "Milk: Its Nutritional Value at a Low Cost for People of All Ages" Dept. of Dairy Science, Louisiana State University, Journal of Dairy Science vol. 53, No. 9, pp. 1296–1302, Sep. 9,1970.

S. Artaud–Wild,et al.; "Differences in Coronary Mortality can be Explained in Cholesterol and Saturated Fat Intakes in 40 Countries but not in France and Finland" Circulation vol. 88, No. 6, Dec. 1993, pp. 2771–2779.

P.F. Fox et al; Salts of Milk; Dairy Chemistry and Biochemistry, Chapter 5, Blackie Academic & Professional, London, Jan. 1998.

*Primary Examiner*—Keith Hendricks
(74) *Attorney, Agent, or Firm*—Norris, McLaughlin & Marcus P.A.

(57) ABSTRACT

The present invention provides methods for: (a) concentrating cholesterol-desaturase activity in a cell free extract, wherein the cell free extract can be a homogenate fraction, a microsomal fraction or a desaturase-enriched fraction from a Tetrahymenidae family microorganism and (b) decreasing the cholesterol content of a foodstuff of animal origin, such as a dairy product. The methods comprise the step of treating a foodstuff by incubating the same with a cell free extract in a effective amount to enable changes in the foodstuff: (a) reduce the level of cholesterol; and (b) increase the level of at least one desaturated cholesterol derivative: Δ7-dehydrocholesterol, Δ22 dehydrocholesterol and/or Δ7,22 bisdehydrocholesterol.

12 Claims, 3 Drawing Sheets

METHODS FOR TREATING FOODSTUFFS USING CELL FREE EXTRACTS FROM CILIATES

This application is a continuation-in-part application of U.S. Ser. No. 09/641,609 filed Aug. 17, 2000, which claim benefit to provisional No. 60/153,754 filed Sep. 13, 1999 which claim benefit to provisional No. 60/153,741 filed Sep. 13, 1999, which claim benefit to provisional No. 60/177,252 filed Jan. 20, 2000, which claim benefit to provisional No. 60/172,844 filed Dec. 20, 1999.

FIELD OF THE INVENTION

This application relates to the isolation of cell free extracts from a microorganism selected from the family Tetrahymenida, such as *Tetrahymena thermophila*. One aspect of the present invention is the provision of methods for the conversion of cholesterol present in foodstuffs into cholesterol desaturated derivatives, including provitamin D, using the cell free extracts.

BACKGROUND OF THE INVENTION

Animal milk is a complex mixture of different compounds, including lipids, proteins, minerals, sugars and vitamins (Russof, L. L. (1970). J. Dairy Science 53:1296–1302). The calcium, phosphate and vitamin D content of milk make it an adequate source of nutrients for bone formation (Fox, P. F. and McSweeney, P. L. H. (1998a) Salts of milk. In "Dairy Chemistry and Biochemistry", chapter 5, Blackie Academic & Professional, London). This may be a key aspect of its role in nature, allowing mammalian newborns to complete the formation of the skeleton after birth. Mineral and vitamin components of milk are also important to preserve bone structure in adulthood. Milk is also relatively economical, compared to other animal protein sources, and thus it makes a valuable contribution to the human diet (Russof, L. L. (1970) J. Dairy Science 53:1296–1302).

The lipid fraction of milk includes cholesterol, however, which has been implicated as a causative agent of coronary artery disease (Artaud-Wild, S. M., Connor, S. L., Sexton, G., Connor, W. E. (1993) Circulation 88: 2771–2779). In effect, the increased blood cholesterol concentration in humans seems to have a direct positive correlation with coronary heart disease. Therefore patients with coronary heart disease (CHD) or hypercholesterolemia are commonly recommended to decrease their dietary cholesterol intake.

Other foodstuffs of animal origin such as eggs, which are commonly used in the preparation of a variety of food products, present the same problem. Because of the special organoleptic traits of milk and eggs, it is difficult to replace them by other products with less cholesterol content.

The general awareness of the risks associated with high blood cholesterol levels is an important factor limiting the consumption of food substances that have high cholesterol content by a health-conscious public. In the past years it has been a significant health trend away from red meat, milk and eggs. Accordingly, there is a continuing and real interest in decreasing the intake of food substances that have high cholesterol content.

To address these problems, there is a need for methods to produce low-cholesterol versions of normally high-cholesterol foodstuffs, such as whole milk and eggs. Such methods should preferably not appreciably change the physical and organoleptic properties of the foodstuffs. The nutritional value of the treated foodstuffs should be preferably maintained, especially the levels of those components that are lipid-soluble and that are important for human nutrition (e.g., vitamins A and D, and essential fatty acids). Thus, the food treatment methods should yield products with lower cholesterol content but which are otherwise similar to the untreated foodstuffs. Additionally, the novel methods should preferably not require expensive equipment and materials or potentially toxic materials, such as organic solvents.

A number of methods have been described in patents in the US and other countries for reducing the cholesterol content of foodstuffs. For example, cholesterol can be removed from foodstuffs by the use of physicochemical methods. For instance, the use of supercritical fluids to produce liquid egg having reduced cholesterol content has been proposed (Ogasahara et al, U.S. Pat. No. 5,116,628, 1992). However, the high temperatures and pressures needed for the process can denature proteins present in the foodstuffs. Likewise, the production of low cholesterol butter oil by vapor sparging (Conte et al, 1992, U.S. Pat. No. 5,092,964) is another example of a method, which, due to the extreme conditions used, is likely to denature proteins and alter organoleptic properties of the foodstuffs.

The use of organic solvents to extract cholesterol from foodstuffs has also been proposed. Thus, Fallis et al (1978, U.S. Pat. No. 4,104,286) have proposed the use of aqueous ethanol, saponification, and extraction with hydrocarbons and methanol to obtain free cholesterol, saponified fats and edible egg powder. This process uses extreme conditions and large quantities of organic solvents that may contaminate the processed foodstuffs. Extraction with liquid dimethylether (Yano et al, 1980, U.S. Pat. No. 4,234,619) is similarly inconvenient and does not appear to be selective for cholesterol as other neutral lipids are removed from the foodstuff. Johnson et al. (1991, U.S. Pat. No. 4,997,668) applied solvent extraction to milk, but again the method does not appear to be selective for cholesterol and utilizes organic solvents that may contaminate foodstuffs.

A variation on the use of organic solvents is to employ oils to extract cholesterol from either aqueous or dry foodstuffs, like egg yolk and dairy products. (Bracco et al, 1982, U.S. Pat. No. 4,333,959; Keen, 1991, U.S. Pat. No. 5,039,541; Conte et al, 1992, U.S. Pat. No. 5,091,203; Merchant et al, 1995, U.S. Pat. No. 5,378,487; Jackeschky, 1998, U.S. Pat. No. 5,780,095). Again, these methods do not selectively extract cholesterol and oils contaminated with cholesterol are inevitably produced, which is undesirable.

Removal of cholesterol by formation of complexes with cyclodextrins has also been proposed for fatty substances of animal origin (Courregelongue et al, 1989, U.S. Pat. No. 4,880,573) and specifically in the case of dairy products (Chung Dae-Won, 1999, Foreign Patent WO 9917620). The formation of complexes of cholesterol and saponin has also been described as a means to reduce cholesterol in milk (Richardson, 1994, U.S. Pat. No. 5,326,579). These methods are, however, too expensive for industrial applications.

A different approach is based on the use of enzymes that modify cholesterol. Thus, the use of cholesterol reductases, that modify cholesterol into poorly absorbed sterols, has been proposed (Beitz et al, 1990, U.S. Pat. No. 4,921,710; Ambrosius et al, 1999, U.S. Pat. No. 5,856,156). Another proposed enzymatic approach is the conversion of cholesterol into epicholesterol, which is then further modified by an epicholesterol dehydrogenase (Saito et al, 1999, U.S. Pat. No. 5,876,993). These methods have the disadvantage that they do not result in the conversion of cholesterol into useful compounds for human nutrition.

There is therefore a need for methods for treating foodstuffs to reduce the amount of cholesterol. Preferably, the cholesterol is converted to one or more substances that are useful for human nutrition.

When Tetrahymena is grown in the presence of exogenous sterols, the biosynthesis of tetrahymanol is completely inhibited and the added sterol is accumulated by the organism and, in most cases, metabolized to other sterols. Different types of biotransformations have been observed, including Δ7 and Δ22 desaturation and the removal of ethyl, but not methyl groups, from C24 (Mallory, F. B. and Conner, R. L. (1971) Lipids 6:149–153; Conner, R. L., Landrey, J. R., Joseph, J. M., Nes, W. R. (1978) Lipids 13: 692–696; Ferguson, K. A., Davis, F. M., Conner, R. L., Landrey, J. R. and Mallory, F. B. (1975) J Biol Chem 250:6998–7005).

In the case of cholesterol, Tetrahymena transforms this sterol into the desaturated derivatives: Δ7,22-bisdehydrocholesterol (a close analog of ergosterol, also called provitamin D2), Δ22-dehydrocholesterol and Δ7-dehydrocholesterol (provitamin D3). (Conner, R. L., Mallory, F. B., Landrey, J. R. and Iyengar, C. W. L. (1969), J Biol Chem 244:2325–2333). The desaturation of cholesterol at position 7 converts it into provitamin D3 and pro vit D derivatives, which upon UV irradiation in the skin can be activated to vitamin D. This biotransformation has seldom been observed in nature.

The present invention describes the isolation of cholesterol desaturases, including Δ7, Δ22 and Δ7, 22 desaturases, in cell free extracts from Tetrahymena.

It is believed that the applicants are the first ever to isolate this activity in cell free extracts and to use these fractions for treating cholesterol-containing foodstuffs.

The cell free extract can be used in the processing of animal food products, reducing cholesterol while simultaneously enhancing provitamin D availability.

The present invention utilizes the foregoing properties of the cell free extract from Tetrahymena, and other protozoa, to provide methods for treating foodstuffs (such as milk, egg and other foodstuffs) to achieve the following goals: (a) reduce the level of cholesterol in foodstuffs and (b) increase the level of cholesterol desaturated derivatives.

SUMMARY OF THE INVENTION

It is a primary object of the present invention is to provide methods for reducing the amount of cholesterol in cholesterol-containing foodstuffs, using cell free extracts from Tetrahymena, preferably without significantly altering the organoleptic properties of the treated foodstuffs.

It is a further object of the present invention to provide means of decreasing the amount of cholesterol in dairy products, such as milk, egg and other products of animal origin.

It is another object of the present invention to provide methods for increasing the amount of Δ7-dehydrocholesterol, Δ22-dehydrocholesterol and Δ7-22didehydrocholesterolin foodstuffs. The present invention provide a method for increasing the amount of provitamin D in foodstuffs. Examples of vitamin D precursors are: Δ7-dehydrocholesterol (provitamin D3) and Δ7-22didehydrocholesterol(a close analog of ergosterol, provitamin D2)

In accordance with the foregoing, in one aspect the present invention provides methods for preparing cell free extracts of Tetrahymena, including homogenate, microsomal fraction and desaturase-enriched preparation for treating cholesterol containing foodstuffs.

In another aspect the present invention provides methods for changing of sterols profiles of a foodstuff, said methods comprising at least the step of treating a cholesterol-containing foodstuff by incubate the same with a cell free extract obtained from a Tetrahymenidae family microorganism in a effective amount to enable the following changes in the composition of the foodstuff: (a)reduce the level of cholesterol and (b) increase the level of at least one cholesterol desaturated derivative: Δ7-dehydrocholesterol, Δ22-dehydrocholesterol or Δ7-22 bisdehydrocholesterol.

Any foodstuff of animal origin can be treated in accordance with the methods of the present invention . The foodstuff can be a dairy product, such as milk, egg yolk or an egg product. The milk can be milk from any mammal, such as cow or goat, and egg yolk can be from eggs of any species of bird, such as domestic chicken eggs. Representative examples of other foodstuffs that can be treated by the methods of the present invention are broth, yogurt, cheese, cream and soups that contain material of animal origin including cholesterol.

The cell free extract comprise at least one cholesterol desaturase that catalyze desaturation of cholesterol to a more desaturated derivate (e.g. Δ7-dehydrocholesterol, Δ22-dehydrocholesterol or Δ7-22 bisdehydrocholesterol. The cell free extract can be an homogenate, a microsomal fraction or an enriched-desaturase fraction obtained from any Tetrahymenidae family microorganism.

When the methods of the present invention are utilized to reduce the level of cholesterol in milk, the level of cholesterol in the milk after treatment is preferably less than 90%, more preferably less than 70%, and more preferably less than 30% of the level of cholesterol in the milk before treatment.

In one embodiment of the invention the homogenate traction obtained from the culture of a member of the family Tetrahymenidae is incubated under conditions that enable a reduction in the level of cholesterol in the treated foodstuff and an increase in the level of at least one cholesterol desaturated derivative, such as Δ22-dehydrocholesterol or a vitamin D precursor (formed by the biochemical conversion of the cholesterol). Representative examples of vitamin D precursors are Δ7-dehydrocholesterol and Δ7 22-didehydrocholesterol.

In another embodiment of the invention a microsomal fraction obtained from cell free homogenates is incubated under conditions that enable a reduction in the level of cholesterol in the treated foodstuff and an increase in the level of at least one cholesterol desaturated derivative, (formed by the biochemical conversion of the cholesterol in the treated foodstuff) such as Δ22-dehydrocholesterol or at least one vitamin D precursors, Δ7-dehydrocholesterol or Δ7 22-didehydrocholesterol.

In another embodiment of the invention a desaturase-enriched fraction obtained from cell free homogenates by extraction and purification is incubated under conditions that enable a reduction in the level of cholesterol in the treated foodstuff and an increase in the level of at least one cholesterol desaturated derivative, (formed by the biochemical conversion of the cholesterol in the treated foodstuff), such as Δ22- dehydrocholesterol or at least one vitamin D precursors, Δ7-dehydrocholesterol or Δ7 22-didehydrocholesterol Representative incubation conditions for lowering the level of cholesterol and increasing the cholesterol desaturated derivatives in liquid suspensions such as milk or diluted egg yolk utilizing *Tetrahymena termophila* cell free extract are: incubation temperature of from 24° C., to 37° C., at a pH of between 5.0 and 8.0, for a time period of from 1 hour to 24 hours.

For example, the methods of the present invention can be used to decrease between 10% to 90% the level of cholesterol initially present in foodstuff to more desaturated cholesterol derivatives such as: Δ7-dehydrocholesterol, Δ22-dehydrocholesterol and Δ7-22 bisdehydrocholesterol. Typically, about 90% of the cholesterol originally present in foodstuff is recovered as cholesterol or desaturated cholesterol derived after treatment in accordance with the present invention.

The methods of the present invention provide several advantages. For example, the methods not only selectively decrease foodstuff cholesterol concentration, preferably without significantly altering organoleptic properties, but at the same time, the process of desaturating cholesterol at position 7, converts it into Δ7-dehydrocholesterol, also known as provitamin D3. Thus, a single reaction decreases an unwanted material (cholesterol), converting it into a desirable one (provitamin D3).

The methods of the present invention make unnecessary milk supplementation with vitamin D by providing provitamin D in amounts that are sufficient for daily requirements. In addition, while vitamin D (a supplement normally added to milk), can have toxic effects, the provitamins have a much lower risk of toxicity. This is due to the fact that the provitamins lack vitamin D activity and they have to undergo chemical conversion by exposure to UV light to become active vitamins.

The methods of the present invention avoid the addition of living organisms therefore reducing the risks of undesirable effects.

In another aspect the present invention provides a cell free extract from Tetrahymenidae family microorganism, wherein said cell free extract containing cholesterol desaturase activities such as Δ-7 and Δ-22 cholesterol desaturases activities that catalyze desaturation of cholesterol, said cell free extract can be a homogenate fraction, microsomal fraction and desaturase-enriched fraction from Tetrahymenidae family microorganism.

In another embodiment the present invention provided a product, such as liquid egg yolk, dehydrated egg yolk, milk, skimmed milk, yogur, cream, cheese, dehydrated milk, obtained by the method of the invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
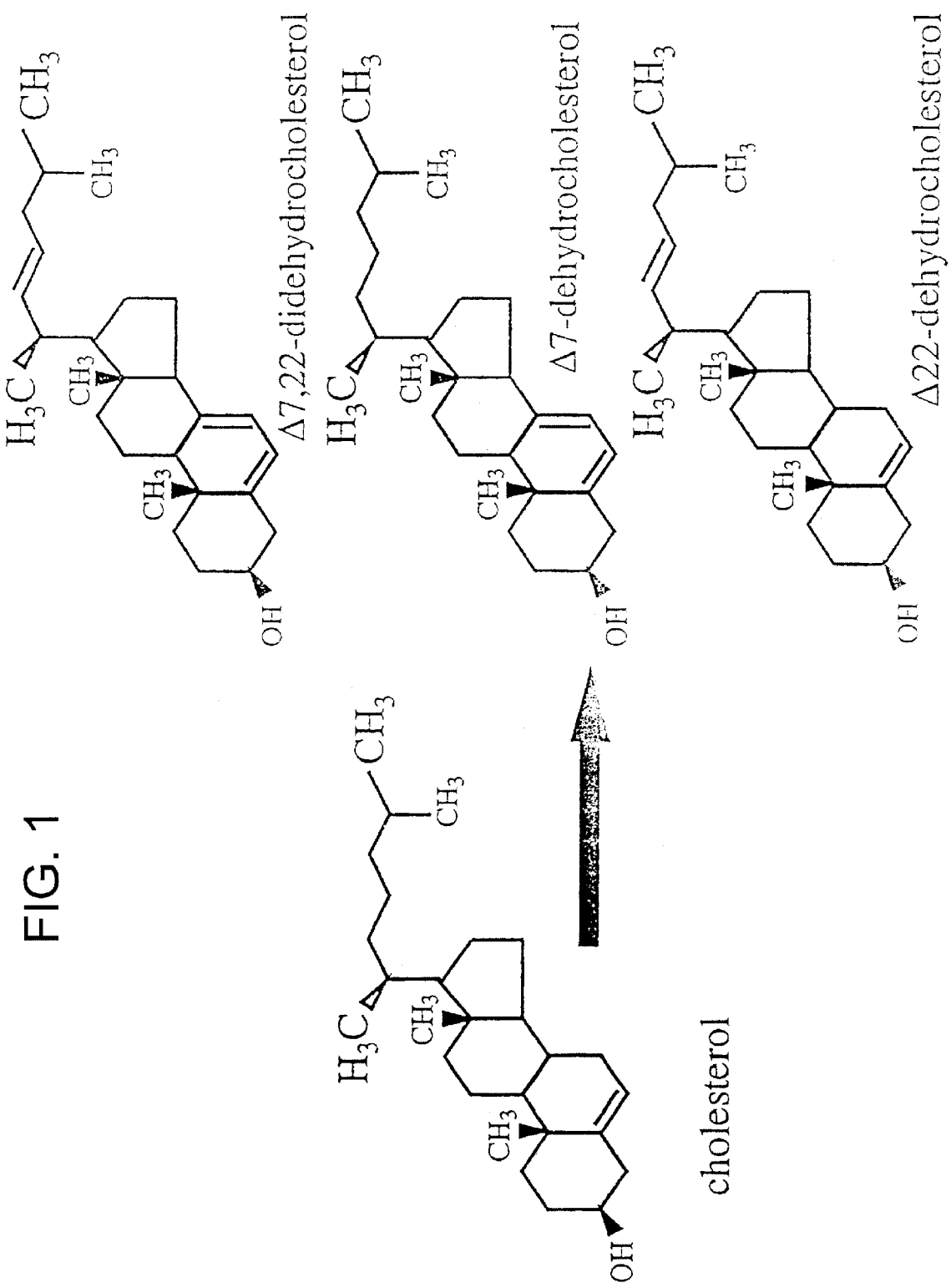
FIG. 1 shows three desaturation products of cholesterol.

As used herein, the term "cholesterol-containing foodstuff" means any natural or synthetic substance that contains cholesterol and that can be consumed by a mammal to provide nutrients.

As used herein, the term "milk product" means milk obtained from the female of any mammalian species, and any edible product or component derived from milk. Representative examples of milk product include whole milk, milk supplemented with one or more nutrients (such as vitamins and minerals), low-fat and skimmed milk, yogur, and cream.

As used herein, the term "cell free extract" means any extract obtained from cultured organisms in which no living cells are detected. Examples of cell free extracts comprise: (a) homogenate fraction obtained by cell lysis of the organism, (b) microsomal fractions, including the membranes fraction present in the homogenate fraction (c) desaturase enriched fraction, obtained by extraction, precipitation and/or purification of the proteins present in the microsomal preparation.

The present invention provides methods for changing of sterol profiles of a foodstuff, the methods comprising the step of treating the same with a cell free extract from a Tetrahymenidae family organism under conditions that enable the following changes in the composition of the foodstuff: (a) reduction in the level of cholesterol in the treated foodstuff; and (b) increase the level of at least one unsaturated derivative of cholesterol at position 7, 22 or both.

Preferably the organoleptic properties of the treated foodstuffs are the same, or substantially the same, as those of the untreated foodstuffs.

Any species of Tetrahymena are useful in the practice of the invention and can be obtained from public depositories such as the American Type Culture Collection (ATCC), 10801 University Boulevard, Manassas, Va. 20110–2209, U.S.A. By way of example *Tetrahymena thermophila* wild type strain CU399.

Preparation of a protozoan culture: any suitable growth medium can be used for culturing the cells to be used in the preparation of cell free extracts. For example, media based on yeast extract, glucose and skimmed milk can yield high cell densities at very low costs (Kiy, T. and Tiedtke, A. (1992), Appl. Microbiol. Biotechnol. 37:576–579, incorporated herein by reference). It is possible also to use a modification of the medium described by Kiy and Tiedtke (1992). The composition of this medium includes yeast extract (0.1 to 10% w/v, preferably 0.5% w/v), glucose (0.1 to 5% w/v, preferably 1% w/v), iron citrate (0.0001 to 0.1% w/v, preferably 0.003% w/v), supplemented with between 1 and 50% v/v fluid skimmed milk (preferably between 5 and 20% v/v). Another useful medium for culturing the protozoa has the same composition as the foregoing, Kiy and Tiedtke medium, except that the fluid milk was replaced with between 0.1 and 5% (preferably 1%) w/v tryptic casein hydrolysate and cholesterol (0.2 mg/100 ml).

Cultivation of the protozoa useful in the practice of the invention can be achieved by any suitable means. For example, fermentors that utilize mechanical stirring, or air lift fermentors can be utilized for large-scale cultivation of the protozoa useful in the practice of the invention.

The optimal culture temperature depends on the strain of protozoa, but typically falls within the range of from 20° C. to 38° C. Similarly, the optimal culture pH depends on the strain of protozoa, but typically falls within the range of from pH 5.0 to pH 8.0. For example, a pH of 6.8 has been successfully used to cultivate *Tetrahymena thermophila* wild type strain CU399. Culture time also depends on the protozoan strain and the chosen method of cultivation. Typically, culture times of between 10 and 80 hours (such as 23–25 hours) are adequate.

Cultivation of the protozoa can be carried out with or without agitation. When agitation is used, exemplary rates of stirring are in the range of from 50 rpm to 600 rpm, typically about 100 rpm. Finally, to achieve high protozoan densities in a relatively short time, cultivation can be carried out in airlift bioreactors (Hellenbroich, D., et al., Appl. Microbiol. Biotechnol. 51:447–455 (1999), incorporated herein as reference) Ill utilizing any suitable medium, such as the media disclosed in Tiedtke and Kiy (German Patent DE 4238842); Kiy and Tiedtke, 1992, supra, each of which publications are incorporated herein as reference. Typically, cell densities of up to $2\times10^7$ cells/ml can be achieved.

Preparation of cell free extracts: In the first step of the concentration process of this invention a homogenate fraction is prepared. The ciliates were harvested from late-log or stationary phase cultures, from of 24 hours to 40 hours culture, removed by centrifugation and suspended 1/10 in 0.2 M $Na_2HPO_4$ buffer (pH 7.2), washed once in the same buffer such as an isotonic aqueous-based buffered salt solution and finally suspended in 10 mM Tris-HCl, 250 mM sucrose, 5 mM $MgCl_2$, 1 mM EDTA (TES-Mg buffer). The buffer has a pH in the range 6.0 to about 7.5. Homogenates were prepared by sonication in an ice-water bath until complete cell lysis. The homogenate was centrifuged and the supernatant ("homogenate fraction") was tested for cholesterol desaturase activity.

The microsomal fraction was prepared by centrifugation at 105,000×g for 1.5 hours of the homogenate. The supernatant was discarded and the pellet obtained was suspended in the same buffer TES-Mg. All procedures were carried out at 4° C. Both pellet and supernatant were tested for desaturase activity.

The desaturase-enriched fraction may be isolated from the microsomal fraction thus obtained, in a conventional manner.

The protein fraction, for example, can be obtained by extracting the microsomal fraction with a detergent solution, centrifugation and further treating the supernatants with ammonium sulphate. After centrifugation the precipitate is dialysed to eliminate salts. This solution contains the desaturase-enriched fraction.

Further purification may be achieved by any known method including but not limited to ion exchange chromatography, hydrophobic interaction chromatography, size exclusion chromatography or affinity chromatography.

It is conceivable that the concentrate can be further treated to obtain substantially 100% pure Δ7 dehydrocholesterol desaturase enzyme and Δ22 dehydrocholesterol desaturase enzyme, however it has been found that this may not be needed and that the cell free fractions itself may be used for the subsequently described methods of cholesterol transformation to Δ7 dehydrocholesterol, Δ22 dehydrocholesterol or Δ7,22 bis-dehydrocholesterol.

It is also in the scope of this invention the use of cholesterol desaturases (Δ7 cholesterol desaturase, Δ22 cholesterol desaturase, or a combination of both) immobilized in a solid matrix, such as alginate beads, for cholesterol biotransformation.

If desired, foodstuffs (for example, milk and egg yolk) treated in accordance with the present invention can be dehydrated and used as a powder.

For commercial production of cholesterol desaturases the genes of cholesterol desaturases may be transferred into another organism such as a bacterial species or yeast. The process would be similar to that now in use for making human insulin, bovine growth hormone or bovine chemosin.

Cholesterol desaturase activity of a cell free extract: homogenate, microsomes or desaturase- enriched fractions were tested by adding radiolabeled cholesterol, and various cofactors such as ATP, NAD, NADP or their reduced derivatives. After incubation at 30° C. during 1 to 6 hours, the reaction was stopped and the sterols were extracted from the reaction mixture and analyzed as described in Example 1.

The radioactive sterols present in the mixture were identified as cholesterol, Δ7-dehydrocholesterol, Δ22-dehydrocholesterol and Δ7-22didehydrocholesterol by co-migration in different chromatographic systems and mass spectroscopy analysis.

Practically all the radioactivity was associated with either untransformed cholesterol or desaturated derivates present in various amounts in the isolated fractions.

Essentially the same procedure was used for testing cholesterol desaturase activity in all the cell free extracts including homogenates, microsomal fractions and desaturase-enriched fractions.

As an example, Table 1 describes the cholesterol derivatives formed after incubation of homogenates fractions with $^3$H-cholesterol.

TABLE 1

Cholesterol derivatives formed by incubation of cellular fractions from *T. thermophila* with radiolabeled cholesterol

| Cellular Fraction | % of total radioactivity converted to $\Delta^7$ dehydro-cholesterol | % of total radioactivity converted to $\Delta^{22}$ dehydro-cholesterol | % of total radioactivity converted to $\Delta^{7-22}$ bisdehydro-cholesterol |
|---|---|---|---|
| homogenate | 7.5 ± (1.1) | 5.2 ± (0.8) | 3.3 ± (0.2) |
| Microsomal fraction | 9.3 ± (1.7) | 7.1 ± (1.8) | 1.9 ± (0.7) |
| Supernatant from microsomal preparation | N.D.$^c$ | N.D.$^c$ | N.D.$^c$ |

$^c$ND: not detected $\Delta^7$-Cholesterol desaturase activity present in the microsomal fraction was further characterised in relation to incubation time and cofactor supplementation.

Figure 3:
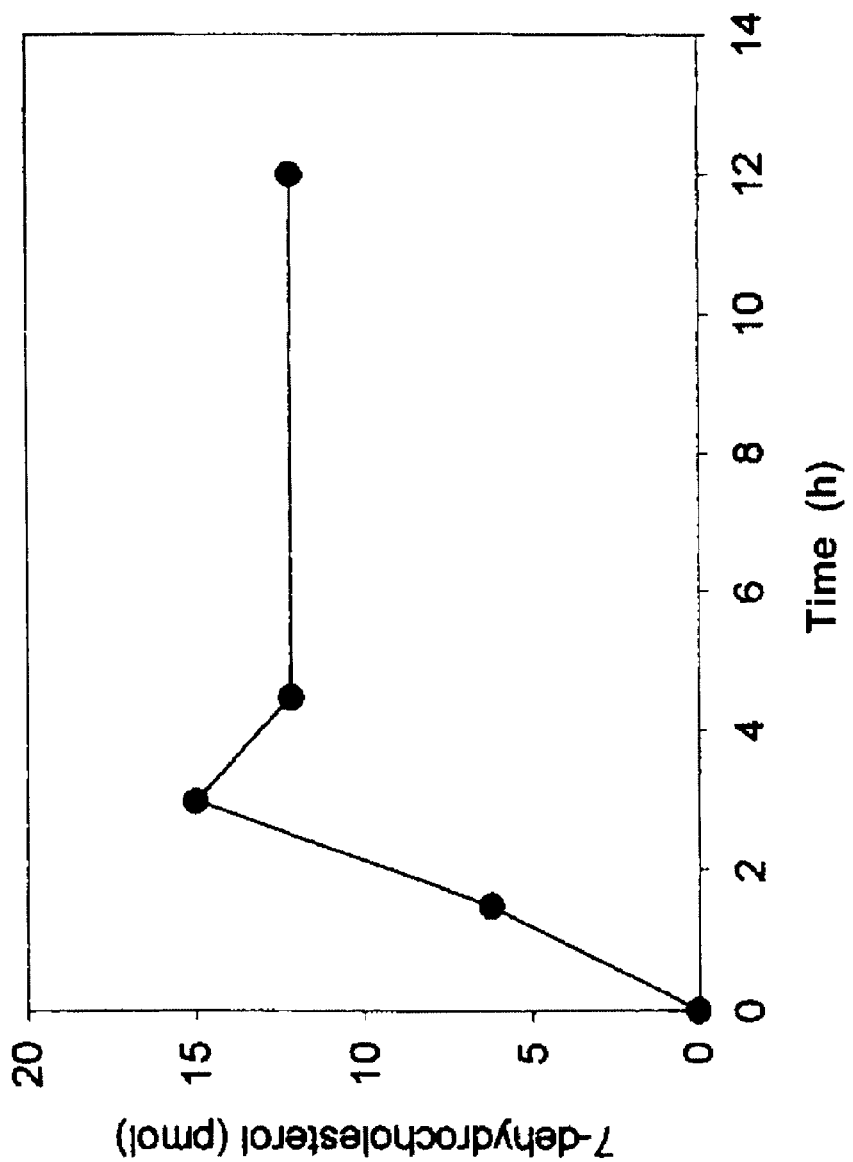
FIG. 3 shows the variation of Δ7-dehydrocholesterol desaturase activity of *Tetrahymena thermophila* microsomal fraction with incubation time. Values are mean of three parallel incubations. Standard deviation did not exceed 5%.

The conversion of cholesterol increased lineally up to 3 hours of incubation. After this period, no further conversion was observed (FIG. 3). Addition of ATP significantly increased the desaturase activity. Addition of other cofactors including NAD, NADP and their reduced derivatives showed no effects on the conversion rate of microsomal preparations.

In addition, $\Delta^7$ cholesterol-desaturase activity was completely abolished after boiling during 10 min at 100° C. This latter condition was therefore used as a control.

The isolation and characterization of $\Delta^7$-cholesterol desaturase activity has been published and is included herein as a reference (Valcarce et al., Appl. Microbiol. Biotecnol. 53: 591–595, 2000).

Treatment of Foodstuffs: The incubation of cholesterol containing foodstuffs with an homogenate, a microsomal fraction or an enriched- desaturase fraction is typically conducted at a temperature in the range of from 20° C. to 40° C. The pH of the foodstuff is adjusted to fall within the range of pH 6.0 to pH 8.0. The desired incubation time mainly depends on the kind and extent of dilution (if any) of the foodstuff being treated. Typically, incubation times are from 0.5 hours to 72 hours (preferentially from 1 to 7 hours).

The incubation of the cell free extracts such as homogenate, microsomal fraction or enriched-desaturase fraction with the foodstuff can be carried out with or without agitation. If stirred, typically a stirring speed of between 50 rpm and 300 rpm (such as about 150 rpm) is utilized. If necessary the foodstuff can be diluted for optimal enzymatic activity. Milk for instance can be diluted with water or any other diluent to a concentration 1/2 to 1/100.

Incubation of the foodstuffs with cell free extracts can be carried out in presence of ATP or other high-energy compounds.

The methods of the present invention can be used to convert between 5% and 90% of the cholesterol initially present in the foodstuffs to cholesterol derivatives, such as $\Delta 7$-dehydrocholesterol (provitamin D3), $\Delta 22$-dehydrocholesterol and $\Delta 7,22$-didehydrocholesterol, a close analog of ergosterol (provitamin D2). Typically, about 90% of the cholesterol originally present in the foodstuff is recovered as untransformed cholesterol or desaturated cholesterol after treatment of the foodstuff in accordance with the present invention.

Any foodstuff of animal origin can be treated in accordance with the methods of the present invention. Examples of these are yogur, cheese, cream, eggs, milk, either whole milk or supplemented with one or more nutrients (such as vitamins and minerals). For example, the egg yolk can be diluted 1/10 and incubated by the desaturase-enriched fraction for 3 hours at 30° C., with gentle stirring (100 rpm). Utilizing this method there was a decrease in the amount of cholesterol and an increase in the unsaturated derivatives.

The following examples merely illustrate the various embodiments now contemplated for practicing the invention but should not be construed to limit the invention.

EXAMPLE 1

The Use of a Homogenate Fraction from *Tetrahymena thermophila* for Treatment of Milk.

Cells and cultures. *Tetrahymena thermophila* wild type strain CU399 was maintained in axenic cultures. Inocula were prepared in medium containing 1% proteose peptone, 0.1% yeast extract (both from Difco Laboratories, Detroit, Mich.), 0.5% glucose and 0.01% Sequestrene (Ciba Geigy, Basel, Switzerland) and sterilized by autoclaving (121° C., 20 min). Erlenmeyer flasks containing 100 ml of the same culture medium with 1 mg of cholesterol added, were inoculated with 10 ml of a late log phase culture and incubated for 40 h, at 30° C., on a rotary shaker at 150 rpm. Cell densities were estimated by counting appropriate dilutions of the cultures fixed with 2% formaldehyde in a Neubauer hemocytometer.

Preparation of the homogenate fraction. The ciliates were harvested by centrifugation at 15,000 g for 10 min, resuspended in 0.2 M $Na_2HPO_4$ buffer (pH 7.2), washed once in the same buffer and finally suspended in 10 mM Tris-HC1, pH 7.2, 250 mM sucrose, 5 mM $MgCl_2$, 1 mM EDTA (TES-Mg buffer). The suspensions were homogeneized by sonication (Vibracell, Sonics & Materials, Inc) in an ice-water bath until complete cell lysis (6 min, approximately). The suspension was centrifuged at 8,800×g for 10 min, and the supernatant (homogenate) was tested for desaturase activity.

Test for desaturase activity. Cholesterol desaturase activity was assayed essentially as described for a fatty-acid desaturase from *Tetrahymena termophila* (Bertram J. and Erwin J. J. Protozool. 28:127–131, 1981). 5 ml of the homogenate (approximately 250 mg of protein) was incubated with 0.01 mg unlabeled cholesterol as the carrier and 0.5 $\mu$Ci of [$^3$H] cholesterol (46 Ci/mmol, Amersham Life Sciences, Buckinghamshire, U.K.). The mixture was incubated for 3 hours in a shaking water bath (150 rpm) at 30° C. Boiled homogenate preparations (10 min, 100° C.) were used as controls. The reaction was stopped by addition of one volume of 2 M sodium hydroxide prepared in methanol/water (1:1 v/v). The mixture was saponified during 1 hour at 60° C. and further extracted.

Analysis of sterols: The unsaponifiable fraction which includes the sterols, was extracted twice with the same volume of chloroform, evaporated under nitrogen at 60° C., suspended in 100 $\mu$l of chloroform and separated by HPLC using a C18 column. Methanol/water (95:5 v/v) was used as mobile phase at 1.3 ml/min. Sterols detection and quantification was monitored with an U.V. detector at 205 nm and 285 nm, or with a radiactivity detector as indicated above (Radiomatic Camberra Instruments).

To aid quantitation, stigmasterol (100 $\mu$g/ml) was added to the reaction mixture prior to saponification and used as internal standard. This sterol separates cleanly from cholesterol and its derivatives under the conditions employed.

The extent of cholesterol desaturase activity was estimated from the conversion of the radiolabeled cholesterol added.

Bioconversion of radiolabeled cholesterol in milk. Radiolabeled cholesterol ([$^3$H] cholesterol) was added from a 40 $\mu$Ci/ml stock solution in ethanol, first by a 1:10 dilution in milk, followed by 2 hours incubation at 30° C. with shaking, to help partition of cholesterol into milk fat globules. Then, 10 ml of this cholesterol-milk intermediate suspension was added to 10 ml of the cell free homogenate and incubated 3 hours at 30° C. with gentle stirring. Total lipids from treated milk were saponofied 1 hour at 60° C. The unsaponifiable fraction was further extracted with hexane and separated by RP-HPLC monitored by radioactivity detector as indicated previously.

In Table 2, the change in cholesterol content before and after treatment of whole milk with and homogenate is displayed. In the conditions described in the present example, roughly 20% of the cholesterol initially present is converted into the desaturated derivatives: $\Delta 7$-dehydrocholesterol (8%), $\Delta 22$-dehydrocholesterol (5%) and $\Delta 7,22$-didehydrocholesterol(3%). Thus, this data show that an homogenate of Tetrahymena cells can be used to reduce cholesterol concentration while at the same time increase the provision of desaturated cholesterol derivatives, including pro-vitamin D.

TABLE 2

Cholesterol conversion in milk treated with a cell-free homogenate from *Tetrahymena termophila*

| Incubation Time (Hours) | Cholesterol ug/ml (%) | $\Delta$-7 dehydro-cholesterol ug/ml (%) | $\Delta$-22 dehydro-cholesterol ug/ml (%) | $\Delta$7-22 bisdehydro-cholesterol ug/ml (%) |
|---|---|---|---|---|
| 0 | 71.5 (100) | ND | ND | ND |
| 3 | 55.7 (77.9) | 6.2 (8.7) | 4.1 (5.7) | 2.7 (3.8) |

ND: no detected

EXAMPLE 2

The Use of a Cell Free Microsomal Fraction from *Tetrahymena thermophila* for Treatment of Milk Preparation of a microsomal fraction from *Tetrahymena termophila* cells: The procedure for Tetrahymena cell culture and homogenate preparation was identical to that set forth in example 1. The cell free homogenate was further centrifuged at 105,000×g for 1.5 hours, and the resulting pellet was separated and suspended in the same buffer (TES-Mg buffer) to 5–10 mg/ml final protein concentration. All procedures were carried out at 4° C.

Assay for desaturase activity. The procedure for assaying the cholesterol desaturase activity in microsomal fractions was essentially as described in example 1, except that 5 ml of the microsomal fraction was used. This volume was incubated with 0.01 mg unlabeled cholesterol as the carrier and 0.5 μCi of [$^3$H] cholesterol (46 Ci/mmol, Amersham Life Sciences, Buckinghamshire, U. K.). Sterols analysis, including saponification, extraction, detection and quantification were as described in example 1.

Figure 2:
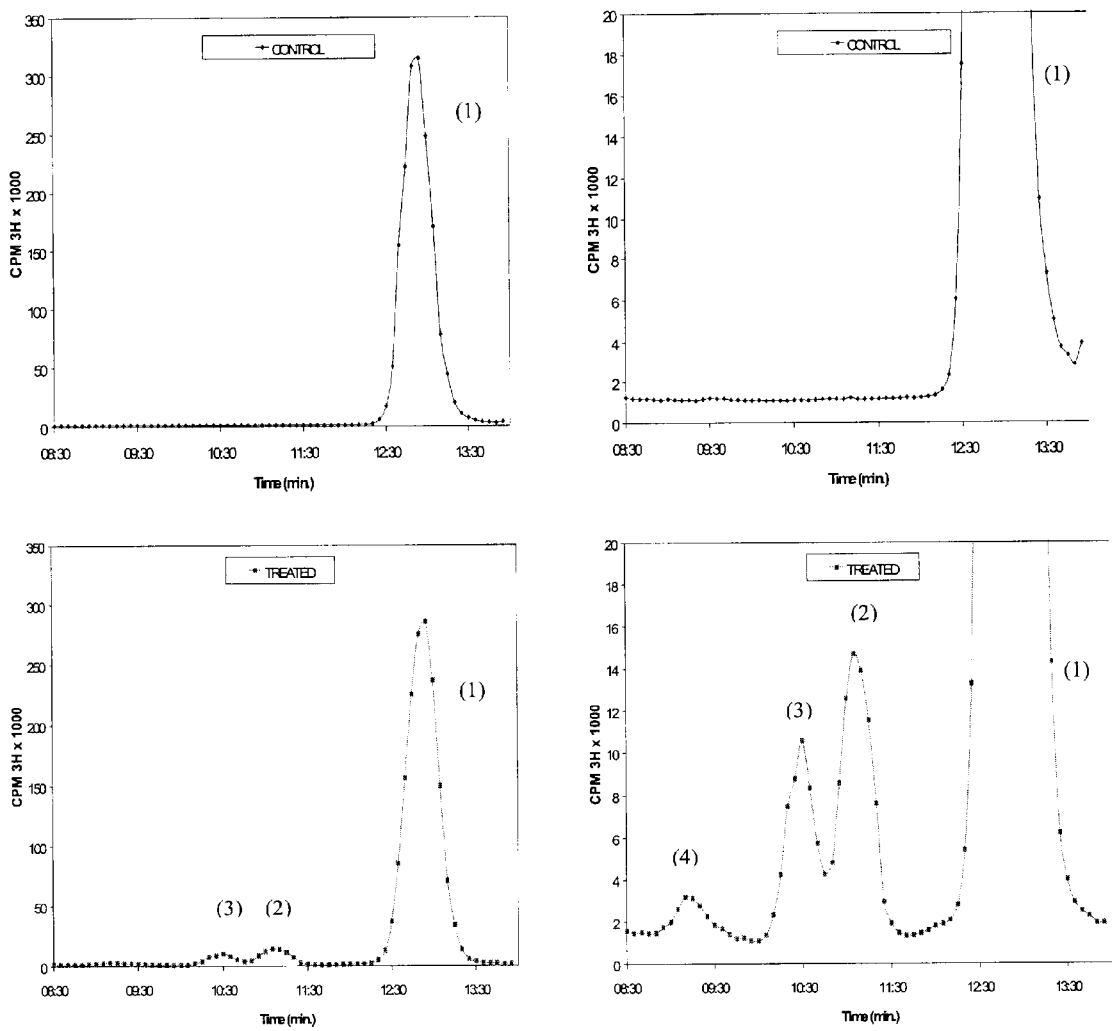
FIG. 2 shows high performance liquid chromatograms showing the separation of radiolabeled cholesterol (peak 1) from its desaturated derivatives, Δ7-dehydrocholesterol (peak 2), Δ22-dehydrocholesterol (peak 3) and Δ7,22-didehydrocholesterol (peak4) before (control) and after (treated) incubation with a microsomal fraction of Tetrahymena cells. The unsaponifiable Age fraction was extracted with chloroform and subjected to HPLC equipped with a radioactivity detector. Further details are described in Example 1.

FIG. 2 shows high performance liquid chromatograms showing the separation of radiolabeled cholesterol (peak 1) from its desaturated derivatives, Δ7-dehydrocholesterol (peak 2), Δ22-dehydrocholesterol (peak 3) and Δ7,22-didehydrocholesterol(peak4) before (control) and after (treated) incubation with a microsomal fraction obtained from Tetrahymena cells. As seen in FIG. 2, incubation of a microsomal fraction with $^3$H-cholesterol resulted in a decrease in the cholesterol level as well as an increase in the level of the desaturated cholesterol derivatives (Table 3).

A higher transformation of cholesterol present can be achieved using an inoculum of higher density or longer incubation periods.

Treatment of milk with the microsomal fraction. For this assay 10 ml of the microsomal fraction (protein concentration 5–10 mg/ml) was incubated with 10 ml of milk containing 0.5 μCi of [$^3$H] cholesterol (46 Ci/mmol, Amersham Life Sciences, Buckinghamshire, U.K). Pyridin cofactors (NAD, NADP, NADH and NADPH; 5 mM each one) and ATP (5 mg/ml) werw added and the mixture was incubated at 30° C. during 3 hours with gentle stirring (100 rpm). Sterols analysis, including saponification, extraction, detection and quantification were as described in example 1.

Utilizing this process there was a decrease in the amount of cholesterol and an increase in the unsaturated derivatives qualitatively and quantitatively similar to the changes reported in Example 1. In Table 3 the change in cholesterol content before and after treatment of whole milk with a cell free microsomal fraction is displayed. Roughly, 20% of the cholesterol initially present in milk is converted into the desaturated derivatives: Δ7-dehydrocholesterol (5.2%), Δ22-dehydrocholesterol (6.5%) and Δ7,22-didehydrocholesterol(4.4%).

TABLE 3

Cholesterol conversion in milk treated with a microsomal fraction from *Tetrahymena termophila*

| Incubation Time (hours) | Cholesterol ug/ml (%) | Δ-7 dehydro-cholesterol ug/ml (%) | Δ-22 dehydro-cholesterol ug/ml (%) | Δ7-22 bisdehydro-cholesterol ug/ml (%) |
|---|---|---|---|---|
| 0 | 70 (100) | ND | ND | ND |
| 3 | 56.5 (80.7) | 5.2 (7.4) | 4.6 (6.5) | 3.1 (4.4) |

ND: no detected

EXAMPLE 3

Use of a Desaturase-enriched Fraction from *Tetrahymena thermophila* for Treatment of Milk Preparation of a desaturase enriched fraction from Tetrahymena termophila cells: The procedure for Tetrahymena cell culture and microsomal preparation was identical to that set forth in Examples 1 and 2. 50 ml of the microsomal fraction (5 mg/ml, protein concentration) was mixed with a detergent solution (N-Octyltioglucoside,Sigma Chem, 5% w/v) to get a final detergent concentration ca 0.35% at pH 7.0. The detergent/ protein ratio was between 0.05 and 10 (w/w).

The suspension was stirred during 4 hours at 15° C. and centrifuged at 105,000×g, 1.5 hours, to remove the non-solubilized components.

After ultracentrifugation and pellet separation solid $(NH_4)_2SO_4$ was added to the supernatant in a water bath set at 50° C. until the concentration of $(NH_4)_2SO_4$ reached 45% w/v. The precipitate formed was centrifuged 10 min at 10,000×g at 5° C. The supernatant was discarded and the precipitate was suspended in 2 ml of a phosphate buffer solution (0.1 M, pH 7.2). This solution was dialyzed during 12 hours at 5° C. with gentle stirring in 500 ml of buffer containing 0.1 M phosphate pH 7.2, 250 mM Sucrose, 0.1 mM EDTA.

After 3 changes of this solution, the sample was diluted to a final protein concentration of 10 mg/ml. This procedure concentrated the cholesterol desaturase activity in a protein-enriched fraction which was tested for desaturase activity.

Test for desaturase activity. The procedure for assaying the cholesterol desaturase activity in desaturase- enriched fractions was essentially as described in example 1, except that 1.0 ml of the protein-enriched fraction (10.0 mg/ml protein) was used. This volume was incubated with 0.01 mg unlabeled cholesterol as the carrier and 0.5 μCi of [$^3$H] cholesterol (46 Ci/mmol, Amersham Life Sciences, Buckinghamshire, U.K.). Pyridin cofactors (NAD, NADP, NADH and NADPH; 5 mM each one) and ATP (5 mg/ml) were added and the mixture was incubated at 30° C. during 3 hours with gentle stirring (100 rpm). Sterols analysis, including saponification, extraction, detection and quantification were as described in example 1.

Treatment of milk with the enriched fraction. For the treatment of milk, 1.0 ml of the desaturase-enriched fraction was mixed with 1 ml of whole milk and incubated in the conditions previously described (3 hours at 30° C., with gentle stirring (100 rpm). Sterols analysis, including saponification, extraction, detection and quantification were as described in example 1.

Utilizing this process there was a decrease in the amount of cholesterol and an increase in the unsaturated derivatives similar to the changes reported in Examples 1, 2 and 3. In Table 4 the change in cholesterol content before and after treatment of whole milk with a cell free desaturase-enriched fraction is displayed. Roughly, 30% of the cholesterol initially present is converted mostly into the desaturated derivatives: Δ7-dehydrocholesterol (11.3), Δ22-dehydrocholesterol (9.1) and Δ7,22-didehydrocholesterol (3.1).

TABLE 4

Cholesterol conversion in milk treated with a desaturase-enriched fraction from *Tetrahymena termophila*

| Incubation Time (hours) | Cholesterol ug/ml (%) | Δ-7 dehydro-cholesterol ug/ml (%) | Δ-22 dehydro-cholesteol ug/ml (%) | Δ-7-22 bisdehydro-cholesterol ug/ml (%) |
|---|---|---|---|---|
| 0 | 74.6 (100) | ND | ND | ND |
| 3 | 51.5 (69.0) | 8.3 (11.3) | 46.8 (9.1) | 5.2 (3.1) |

ND: no detected

EXAMPLE 4

Use of a Desaturase-enriched Fraction from *Tetrahymena thermophila* for Treatment of Egg Yolk Preparation of a desaturase enriched fraction from *Tetrahymena termophila* cells: Proceed as in example 4.

Test for desaturase activity: Proceed as in example 4

Treatment of yolk with the enriched fraction. For the treatment of yolk, 1.0 ml of the desaturase-enriched fraction was mixed with 10 ml of a 1/10 dilution of yolk and incubated in the conditions previously described for milk (3 hours at 30° C., with gentle stirring (100 rpm). Sterols analysis, including saponification, extraction, detection and quantification were as described in example 1.

Utilizing this process there was a decrease in the amount of cholesterol and an increase in the unsaturated derivatives similar to the changes reported in previous examples for milk. In Table 5 the change in cholesterol content before and after treatment of diluted yolk with a cell free desaturase-enriched fraction is displayed.

TABLE 5

Cholesterol conversion in diluted yolk treated with a desaturase-enriched fraction from *Tetrahymena termophila*

| Tiempo (hs) | Cholesterol mg/ml (%) | 7 dehydrochol. mg/ml %) | 22 dehydrochol. mg/ml (%) | 77-22 bis dehydrochol. mg/ml (%) |
|---|---|---|---|---|
| 0 | 1.40 (100) | ND | ND | ND |
| 03 | 0.91 (65.1) | 0.19 (14.0) | 0.11 (8.2) | 0.10 (7.7) |

ND: no detected

The embodiments of the invention in which an exclusive property or privilege is claimed are defined as follows:

1. A method for changing the sterols profiles of a foodstuff, said method comprising at least the step of treating a foodstuff by incubating the same with a cell free extract, wherein the cell free extract is selected from the group consisting of a homogenate fraction, microsomal fraction, desaturase-enriched fraction, and combinations thereof, each obtained from a member of the Tetrahymenidae family in an effective amount to effect changes in the composition of the foodstuff, the changes comprising: (a) reducing the level of cholesterol and (b) increasing the level of at least one cholesterol desaturated derivative.

2. The method of claim 1, wherein the foodstuff is a diary product.

3. The method of claim 2, wherein the foodstuff consists essentially of whole milk.

4. The method of claim 2, wherein the foodstuff is egg or an egg product.

5. The method of claim 1, wherein the foodstuff is selected from the group consisting of whole milk, egg and egg yolk.

6. The method of claim 5, wherein the level of cholesterol in the treated whole milk is reduced to about 5% to about 90% of the level of cholesterol in the whole milk before the treating step.

7. The method of claim 5, wherein the level of cholesterol in the treated egg yolk is reduced to about 5% to about 90% of the level of cholesterol in the egg yolk before the treating step.

8. The method of claim 5, wherein the whole milk is incubated with the cell free extract at a temperature of from 24° C. to 37° C., at a pH of between 5.0 and 8.0, for a time period of from 1 to 24 hours.

9. The method of claim 5, wherein the egg yolk is incubated with the cell free extract at a temperature of from 24° C. to 37° C., at a pH of between 5.0 and 8.0, for, a time period of from 1 to 24 hours.

10. The method of claim 1, wherein the cholesterol desaturated derivative is selected from the group consisting of $\Delta 7$-dehydrocholesterol, $\Delta 22$-dehydrocholesterol and $\Delta 7,22$-bidehydrocholesterol desaturated derivatives.

11. The method of claim 10, wherein the combined levels of $\Delta 7$-dehydrocholesterol, $\Delta 22$-dehydrocholesterol and $\Delta 7,22$-bidehydrocholesterol in milk treated in accordance with claim 1 is greater than 12 $\mu g/ml$ after 3 hours of treatment.

12. The method of claim 10, wherein the combined levels of $\Delta 7$-dehydrocholesterol, $\Delta 22$-dehydrocholesterol and $\Delta 7,22$-bidehydrocholesterol in egg yolk treated in accordance with claim 1 is greater than 0.4 mg/ml after 3 hours of treatment.

* * * * *